US012711122B2

(12) United States Patent
Ahmadi et al.

(10) Patent No.: US 12,711,122 B2
(45) Date of Patent: Aug. 18, 2026

(54) VALIDATION MODES FOR DML STATEMENTS

(71) Applicant: Snowflake Inc., Bozeman, MT (US)

(72) Inventors: Hossein Ahmadi, Seattle, WA (US); Benjamin Farr Hannel, San Carlos, CA (US); Fabian Hüske, Berlin (DE); Xinglian Liu, Redmond, WA (US); Lukas Simon Probst, Berlin (DE); Eric Robinson, Sammamish, WA (US); Ankur Sharma, Berlin (DE); Lars Volker, Los Altos, CA (US)

(73) Assignee: Snowflake Inc., Bozeman, MT (US)

( * ) Notice: Subject to any disclaimer, the term of this patent is extended or adjusted under 35 U.S.C. 154(b) by 16 days.

(21) Appl. No.: 19/042,909

(22) Filed: Jan. 31, 2025

(65) Prior Publication Data

US 2026/0099487 A1 Apr. 9, 2026

Related U.S. Application Data

(60) Provisional application No. 63/703,569, filed on Oct. 4, 2024.

(51) Int. Cl.
*G06F 16/22* (2019.01)
*G06F 16/23* (2019.01)

(52) U.S. Cl.
CPC ...... *G06F 16/2282* (2019.01); *G06F 16/2365* (2019.01)

(58) Field of Classification Search
None
See application file for complete search history.

(56) References Cited

U.S. PATENT DOCUMENTS 11,593,345 B1 * 2/2023 Akidau ............... G06F 16/2456
2023/0177039 A1 * 6/2023 Muralidhar ......... G06F 16/2322 707/703
2023/0237043 A1 * 7/2023 Akidau ............... G06F 16/2282 707/648

* cited by examiner

*Primary Examiner* — Scott A. Waldron
(74) *Attorney, Agent, or Firm* — Schwegman Lundberg & Woessner, P.A.

(57) ABSTRACT

The subject technology receives a first query. The subject technology determines a set of rows that are modified based on performing the first DML operation on the first table, the set of rows including a first set of updated rows. The subject technology generates a first delta file based on the determined set of rows. The subject technology generates a first updated rows file based on a first set of updated rows. The subject technology determines a second set of rows of the first table that have not been modified by performing the first DML operation on the first table. The subject technology generates a first residual file based on the second set of rows. The subject technology performs a validation process to validate the first DML operation using at least the first delta file, the first residual file, and a matching CoW file.

20 Claims, 15 Drawing Sheets

VALIDATION MODES FOR DML STATEMENTS

CROSS-REFERENCE TO RELATED APPLICATIONS

This application claims priority to U.S. Provisional Patent Application No. 63/703,569, filed on Oct. 4, 2024, entitled "VALIDATION MODES FOR DML STATEMENTS," and the contents of which are incorporated herein by reference in its entirety for all purposes.

TECHNICAL FIELD

Embodiments of the disclosure relate generally to cloud data platforms and, more specifically, to implementations of Data Manipulation Language (DML) for SQL (Structured Query Language) used to manage and manipulate data within a database system(s), and the like.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

A data platform may store database data (e.g., a table) in multiple storage units, which may be referred to as partitions, micro-partitions, and/or by one or more other names. A database may be organized as records (e.g., rows or a collection of rows) that each include one or more attributes (e.g., columns). In an example, multiple storage units of a database can be stored in a block and multiple blocks can be grouped into a single file. That is, a database can be organized into a set of files where each file includes a set of blocks, where each block includes a set of more granular storage units such as partitions. It should be understood that the terms "row" and "column" are used for illustration purposes and these terms are interchangeable. For example, data arranged in a column of a table can similarly be arranged in a row of the table.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

When a DML query modifies data in a micro-partition, some existing implementations copy all unchanged rows into a new partition version, which leads to significant write overhead for queries that update only a small fraction of rows across a large number of partitions. The subject technology improves this mechanism by providing delta files, which include updated rows, and an additional bitset to indicate which rows of the original file have been updated or deleted.

Embodiments of the subject technology provide validation techniques for delta files that are utilized in connection with DML statements. Advantageously, the described validation mechanism enables the validation of both the writing and reading of new files without relying on unvalidated features for query execution. In particular, embodiments of the subject technology provide various phases of validation as discussed further herein.

Figure 1:
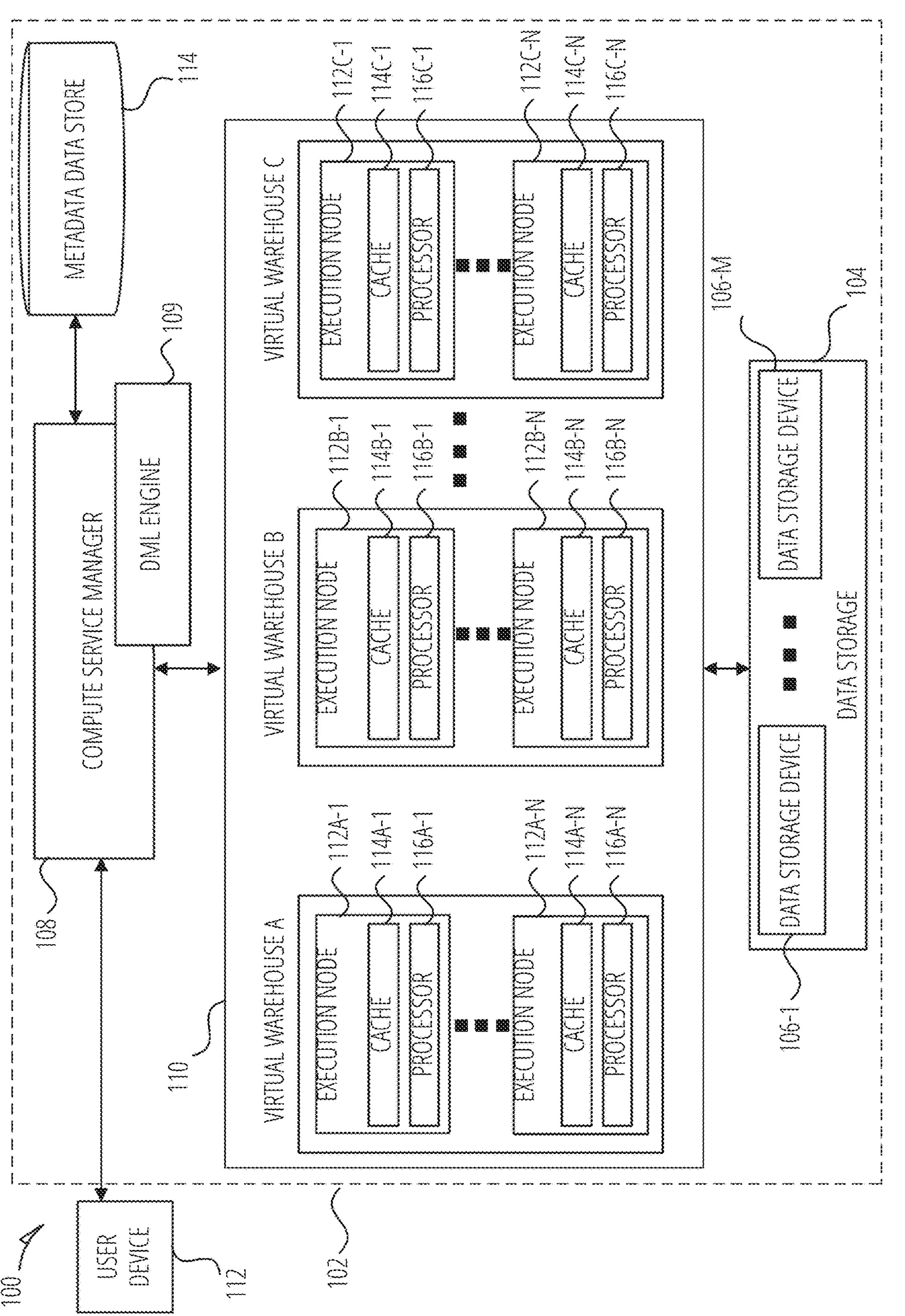
FIG. 1 illustrates an example computing environment that includes a data platform, in accordance with some embodiments of the present disclosure.

FIG. 1 illustrates an example computing environment 100 that includes a data platform 102, in accordance with some embodiments of the present disclosure. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the computing environment 100 to facilitate additional functionality that is not specifically described herein.

As shown, the data platform 102 comprises a three-tier architecture: a compute service manager 108 coupled to a metadata data store 114, an execution platform 110, and data storage 104. The data platform 102 hosts and provides data access, management, reporting, and analysis services to multiple client accounts. Administrative users can create and manage identities (e.g., users, roles, and groups) and use permissions to allow or deny access to the identities to resources and services. The data platform 102 is used for reporting and analysis of integrated data from one or more disparate sources including storage devices within the data storage 104. The data storage 104 comprises a plurality of computing machines and provides on-demand computer system resources such as data storage and computing power to the data platform 102.

The compute service manager 108 includes multiple services that coordinate and manage operations of the data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 114. The metadata data store 114 stores metadata pertaining to various functions and aspects associated with the data platform 102 and its users. The metadata data store 114 also includes a summary of data stored in data storage 104 as well as data available from local caches. Additionally, the metadata data store 114 includes information regarding how data is organized in the data storage 104 and the local caches.

As shown, the compute service manager 108 includes a DML engine 109 that is responsible for performing operations related to improving DML queries, including at least generating and maintaining delta files, bitsets, and related metadata, as discussed further herein. Further details of the operation of the DML engine 109 are discussed below.

As further shown, compute service manager 108 includes a validation service 111 that is responsible for performing operations related to the validation of queries, including those involving the aforementioned delta files and bitsets, using at least some of the techniques described further herein.

The compute service manager 108 is also in communication with a user device 112. The user device 112 corresponds to a user of one of the multiple client accounts supported by the data platform 102. In some implementations, the compute service manager 108 does not receive any direct communications from the user device 112 and only receives communications concerning jobs from a queue within the data platform 102.

The compute service manager 108 is also coupled to the metadata data store 114. The metadata data store 114 stores metadata pertaining to various functions and aspects associated with the data platform 102 and its users. The metadata data store 114 also includes a summary of data stored in data storage 104 as well as data available from local caches. Additionally, the metadata data store 114 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution node 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution node 112B-1 to 112B-N; execution node 112B-1 includes a cache 114B-1 and a processor 116B-1; and execution node 112B-N includes a cache 114B-N and a processor 116B-N. Additionally, virtual warehouse C includes execution node 112C-1 to 112C-N; execution node 112C-1 includes a cache 114C-1 and a processor 116C-1; and execution node 112C-N includes an execution node 112C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Figure 2:
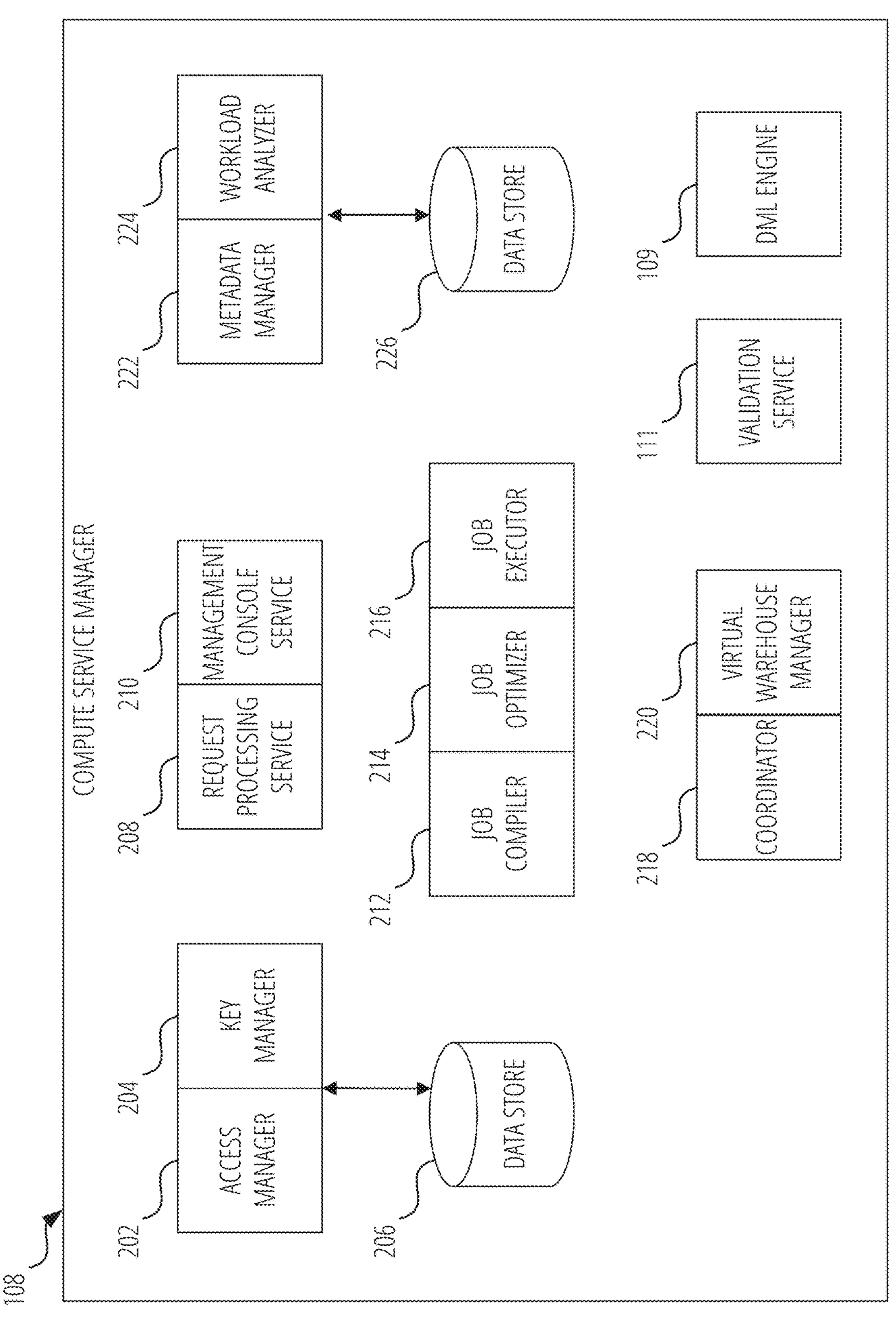
FIG. 2 is a block diagram illustrating components of a compute service manager of the cloud data platform, in accordance with some embodiments of the present disclosure.

Although each virtual warehouse shown in FIG. 2 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 2 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the data storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 2. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 2 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 2, the data storage devices 106-1 to 106-M are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 114, execution platform 110, and data storage 104 are shown in FIG. 2 as individual discrete components. However, each of the compute service manager 108, metadata data store 114, execution platform 110, and data storage 104 may be implemented as a distributed system (e.g., distributed across multiple systems/platforms at multiple geographic locations). Additionally, each of the compute service manager 108, metadata data store 114, execution platform 110, and data storage 104 can be scaled up or down (independently of one another) depending on changes to the requests received and the changing needs of the data platform 102. Thus, in the described embodiments, the data platform 102 is dynamic and supports regular changes to meet the current data processing needs.

As mentioned further herein, terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file includes a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, the metadata data store 114 includes EP files (expression property files), where each of the EP files store a collection of expression properties about corresponding data. As mentioned before, EP files provide a similar function to an indexing structure into micro-partition metadata. Metadata may be stored for each column of each micro-partition of a given table.

In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform. In embodiments herein, each file includes data, which can be further compressed (e.g., using an appropriate data compression algorithm or technique) to reduce a respective size of such a file.

In some embodiments, metadata may be generated when changes are made to one or more source table(s) using a data manipulation language (DML), where such changes can be made by way of a DML statement. Examples of modifying data, using a given DML statement, may include updating, changing, merging, inserting, and deleting data into a source table(s), file(s), or micro-partition(s).

As shown in FIG. 2, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the data platform 102. For example, data store 226 may represent caches in execution platform 110, storage devices in data storage 104, the metadata data store 114, or any other storage device or system.

In addition, as mentioned above, the compute service manager 108 includes a DML engine 109 that is responsible for performing operations related to improving DML queries, including at least generating and maintaining delta files, bitsets, and related metadata, as discussed further herein. Further details regarding the functionality of the DML engine 109 are discussed below.

Figure 3:
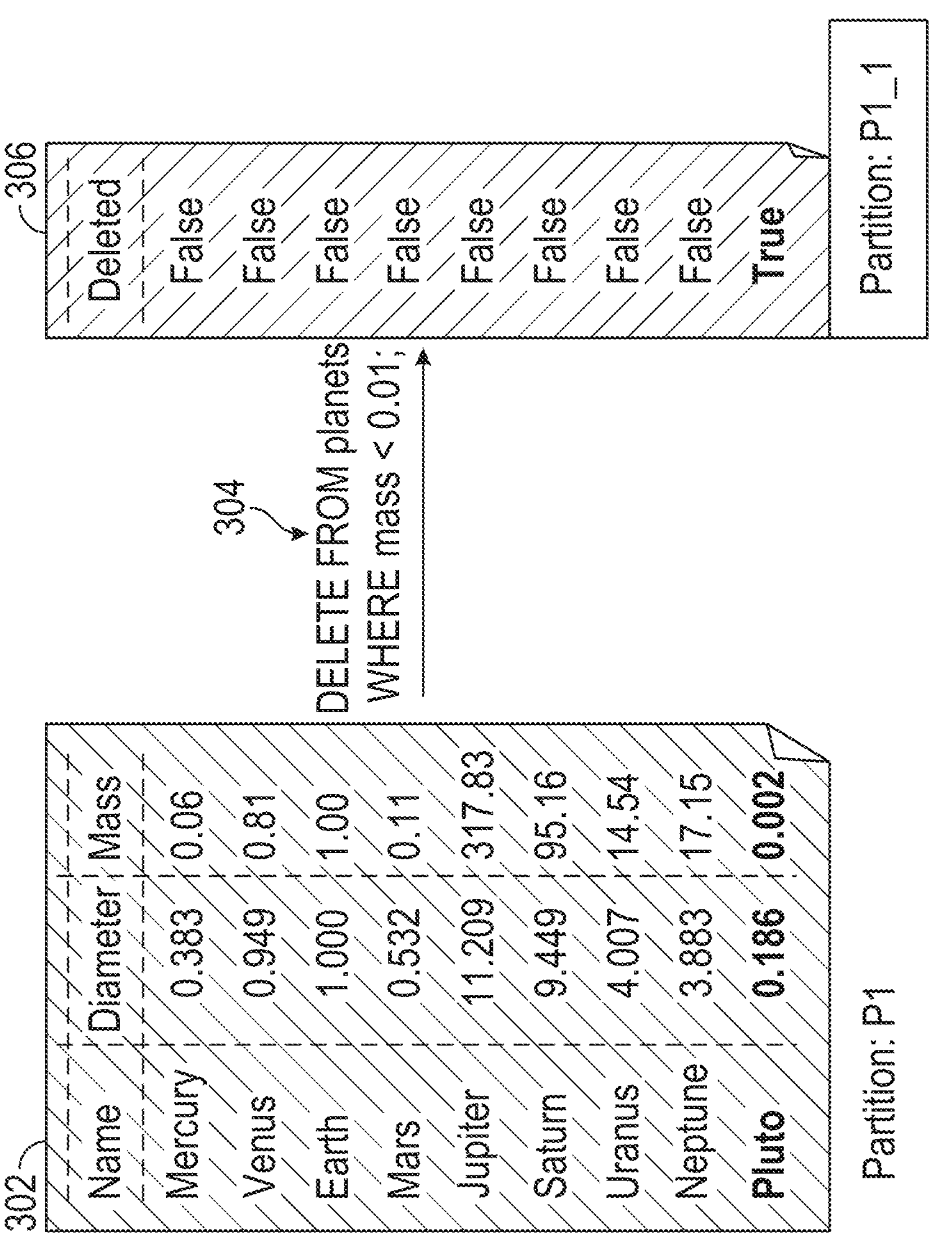
FIG. 3 illustrates an example of performing a delete operation with bitsets, in accordance with an embodiment of the subject technology.

FIG. 3 illustrates an example of performing a delete operation with bitsets, in accordance with an embodiment of the subject technology. In an implementation, DML engine 109 can perform at least some of the operations discussed below.

In the example of FIG. 3, file 302 is processed in view of query 304, in which the result of this query is represented by bitset 306. As shown, partition P1_1 includes bitset 306. Partition P1 can be understood as a logical concept which includes a set of rows, while a file (e.g., file 302) is stored on a disk or in an object store. In an example, a given partition (e.g., partition P1) can include one or two files.

In an example, file 302 includes data for a table of data including values for name, diameter, and mass, each of which is a separate column in each row of the table.

The subject technology introduces delta files, which are created by DMLs that delete and/or update rows. A delta file is associated with exactly one data file referred to as its root file, and stores the difference to that root file. A root file can have exactly zero or one active delta file, and chains of delta files, therefore, are not created. Instead, subsequent updates will replace an existing delta file with a new one.

The subject technology advantageously provides the following improvements: 1) enabling computing advanced metadata (e.g., number of distinct values, the like), thereby improving read operation performance; 2) integrating bitsets in micro-partition files, thereby enabling leveraging storage management and optimization features such as encryption and caching.

The subject technology introduces delta files, which are created by DMLs that delete and/or update rows. A delta file is associated with exactly one data file referred to as its root file, and stores the difference to that root file. A root file can have exactly zero or one active delta file, and chains of delta files, therefore, are not created. Instead, subsequent updates will replace an existing delta file with a new one.

The subject technology advantageously provides the following improvements: 1) enabling computing advanced metadata (e.g., number of distinct values, the like), thereby improving read operation performance; 2) integrating bitsets in micro-partition files, thereby enabling leveraging storage management and optimization features such as encryption and caching.

The following discussion relates to a logical layout for a delta file.

Figure 4:
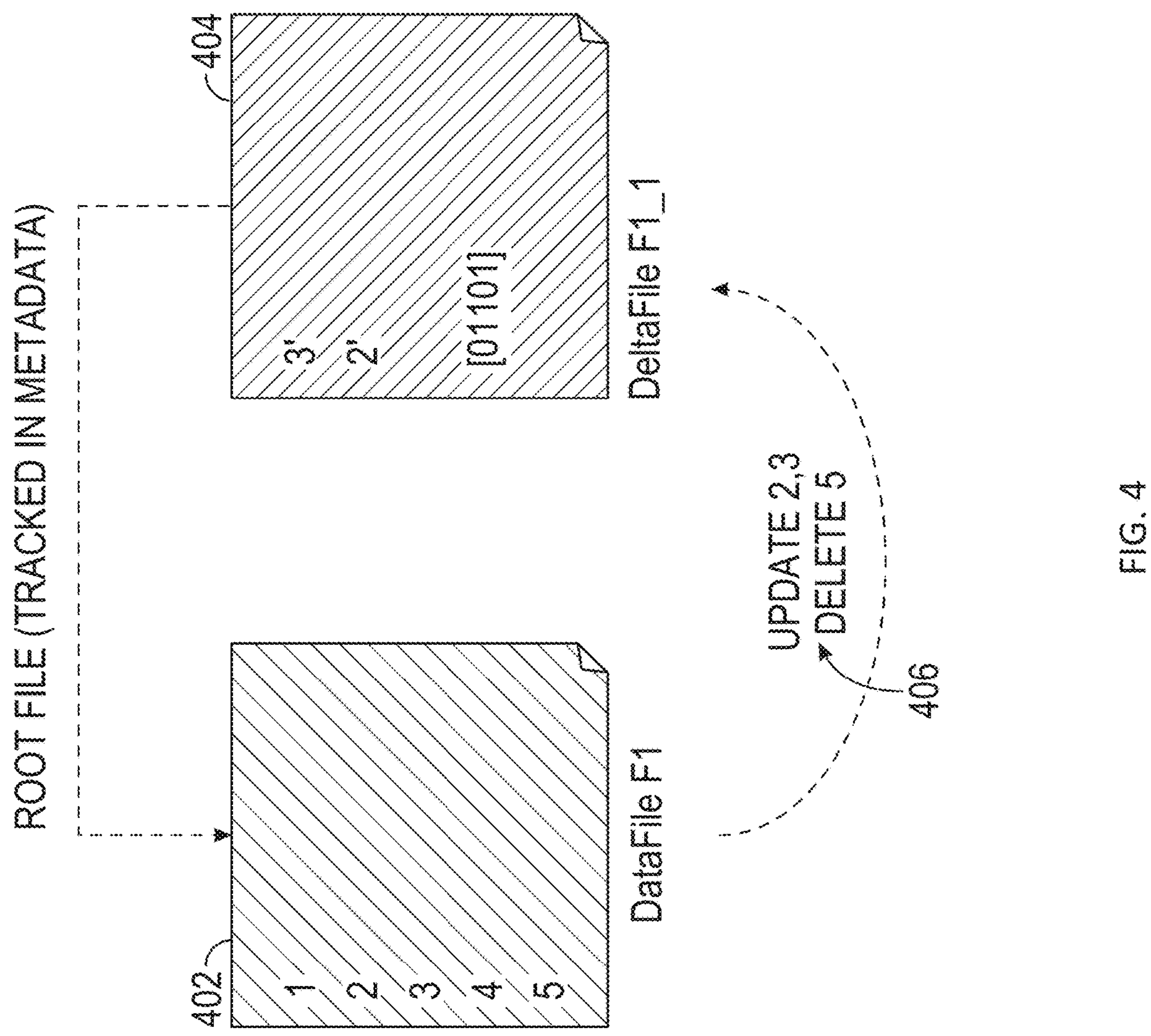
FIG. 4 illustrates an example of a logical layout of a delta file, in accordance with an embodiment of the subject technology.

FIG. 4 illustrates an example of a logical layout of a delta file, in accordance with an embodiment of the subject technology. In an implementation, DML engine 109 can perform at least some of the operations discussed below.

In the example of FIG. 4, root file 402 and delta file 404 are illustrated where delta file 404 is associated with root file 402 based on a set of queries 406 that includes a first query with an update statement and a second query with a delete statement for performing on root file 402. The root file 402, in this example, includes a set of rows, each row having a value (e.g., as included in a column).

In an implementation, a delta file (e.g., delta file 404) stores:

1. A bitset set to mark rows of its root file as unregistered, i.e., deleted or updated.
2. Optionally a set of rows that are new versions of updated rows of its root file (e.g., this could be left out if no rows were updated such as in a DELETE statement). The order of the updated rows is not specified, i.e., their original order from the root file is not maintained.

Figure 5:
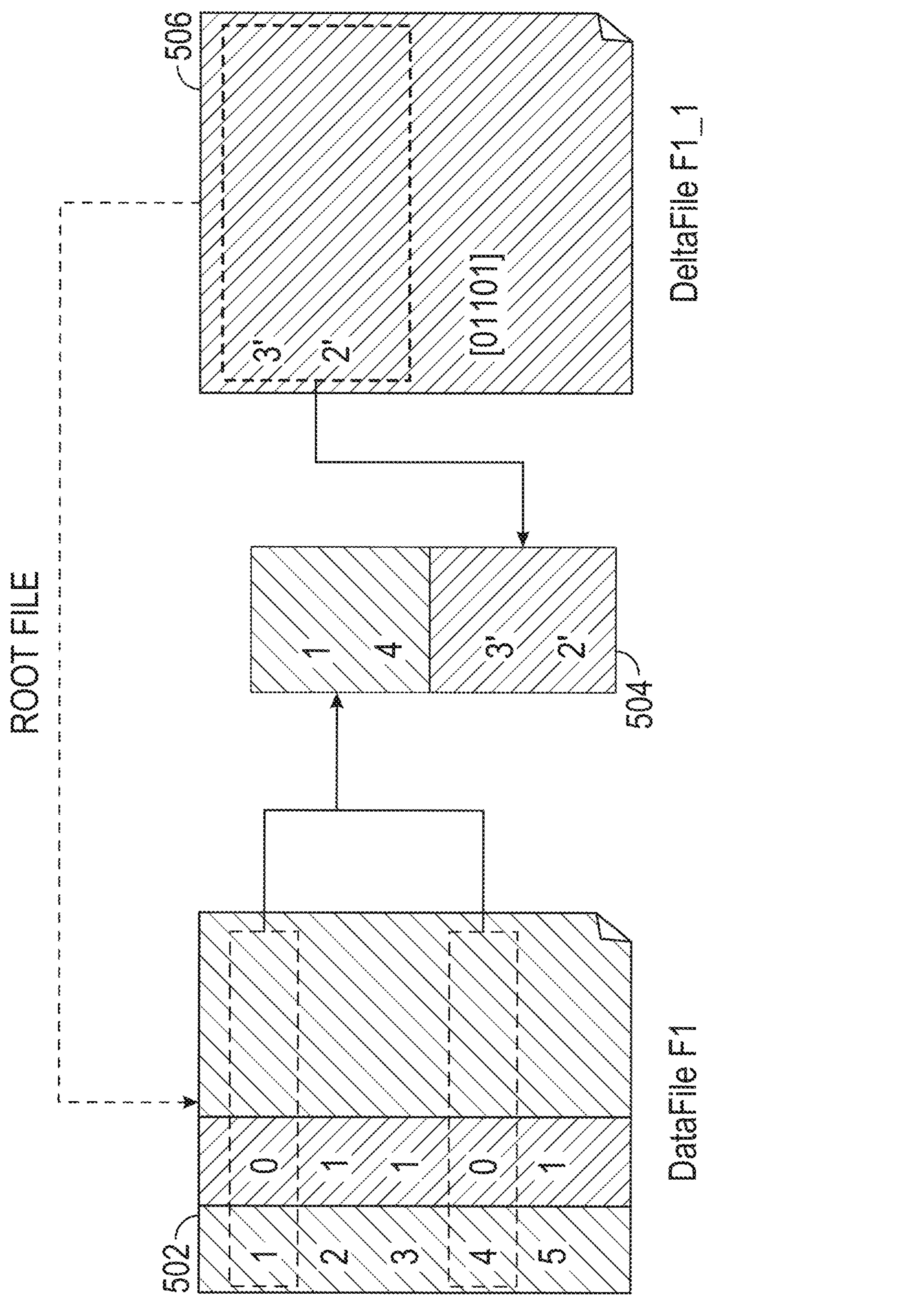
FIG. 5 illustrates an example of producing logical content of a delta file, in accordance with an embodiment of the subject technology.

FIG. 5 illustrates an example of producing logical content of a delta file, in accordance with an embodiment of the subject technology. In an implementation, DML engine 109 can perform at least some of the operations discussed below.

In an implementation, the delta file-to-root file relationship is tracked in metadata (e.g., EP metadata and the like) and not in the delta file, at least because physical file names are not fixed (e.g., can change in view of performing rekeying, replication). In the example of FIG. 5, a root file of delta file 506 corresponds to data file 502.

Since the delta file stores the differences from its root file, the combined partition, which includes the delta file combined with the root file, includes the same data as a data file that was created using a copy-on-write mechanism. Copy-on-write (CoW) refers to a data processing technique such that when a database needs to modify data (e.g., as part of executing a given query), instead of modifying the existing data, CoW creates a new copy of the data (e.g., table, partition, file, and the like) with the modifications.

The logical content of a delta file, such as logical content 504, can be constructed by scanning its root file and filtering the rows using the delta file's bitset and scanning the delta file's updated rows.

In an example, a combined partition includes the rows that are obtained by applying the delta file on top of the root file, i.e. it can include one file (root file only) or two files (root+delta).

Figure 6:
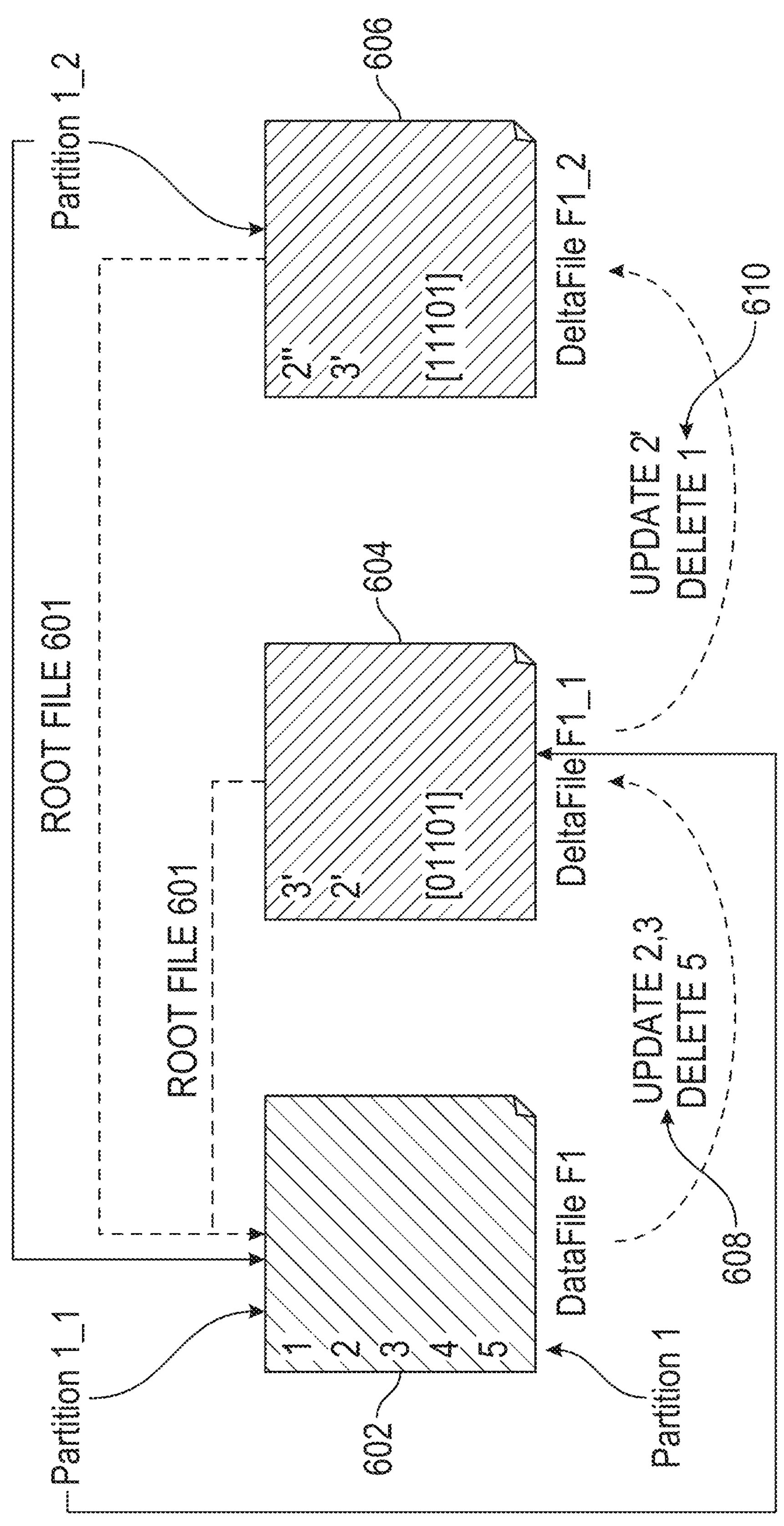
FIG. 6 illustrates an example of producing a delta file, in accordance with an embodiment of the subject technology.

FIG. 6 illustrates an example of producing a delta file, in accordance with an embodiment of the subject technology. In an implementation, DML engine 109 can perform at least some of the operations discussed below.

In FIG. 6, query 608 is executed on data file 602 to generate delta file 604. Subsequently, delta file 606 is generated based on query 610 being processed on the partition including root file 601 and delta file 604.

A delta file (e.g., delta file 606) can be produced when a DML statement(s) (e.g., query 610) deletes or updates rows that are (logically) contained in a delta file (e.g., delta file 604). The new delta file (e.g., delta file 606) will inherit the root file, the bitset, and all updated rows from the updated delta file and apply all additional changes of the current DML on top, i.e., it can mark additional rows in the bitset and store additional updated rows. Updated rows of the updated delta file that are not modified are copied forward into the new delta file, resulting in a CoW-like update behavior between two delta files. These delta files (e.g., delta file 604 and delta file 606) are referred to further herein as stacked delta files.

As illustrated, a first partition (e.g., partition 1) includes data file 602, a second partition (e.g., partition 1_1) includes data file 602 and delta file 604, and a third partition (e.g., partition 1_2) includes data file 602 and delta file 606.

The following discussion relates to one example of validation.

To validate whether a result is correct (e.g., from a given query), the execution node writes an additional validation file together with the delta file. This means that during validation, three files are involved: the root file, delta file, and validation file. The validation file includes the full result of applying the query to the root file, both modified and unmodified rows, as it does today.

Figure 7:
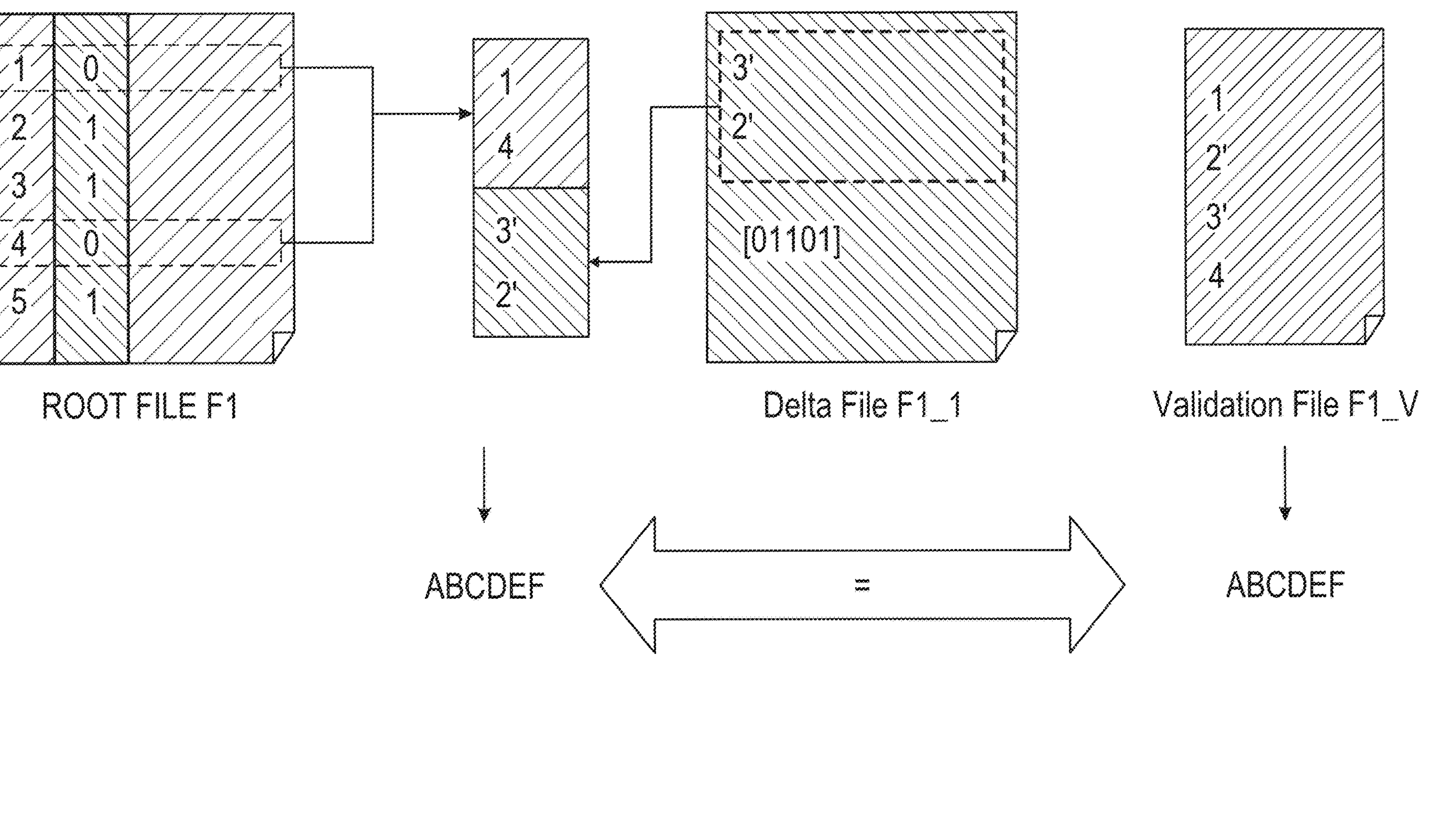
FIG. 7 illustrates an example of background validation, in accordance with an embodiment of the subject technology.

FIG. 7 illustrates an example of background validation, in accordance with an embodiment of the subject technology. Such background validation can be performed by compute service manager 108 in an implementation, or in an implementation at least a portion is performed by a given execution node.

In an implementation, a Data Consistency Service (DCS) performs a background check for combined partitions. In an implementation, the DCS may be included as part of validation service 111. The DCS and various validation processes (e.g., provided by validation service 111) may utilize a compute service framework (e.g., as provided by data platform 102 for accessing compute service manager 108). The check will scan combined partitions in two ways, hash the results of both scans, and compare the hashes. The two scan methods are:

- A combined partition scan that reads the root file, filters out rows marked by the delta file's bitset and adds all updated rows of the delta file.
- A regular scan of the validation file. Both scans must produce the same data. An order-independent hashing is utilized to compare the rows from both scans so that the order of the rows does not affect the comparison.

Embodiments of the subject technology provide a multi-phase validation approach that provides at least the following:

- Phased Implementation: The multi-phase validation approach can minimize risks and enable thorough testing at each stage.
- Data Integrity: By comparing CoW (Copy on Write) partitions with combined partitions, the validation process ensures data consistency and correctness throughout the transition to the new system.
- Minimal Customer Impact: The use of sampling when writing validation files and background reading/validation of data helps isolate customers from potential performance regressions and correctness bugs.
- Performance Optimization: The validation mechanism allows for writing and reading new file formats without relying on unvalidated features for customer query execution, thus maintaining performance while ensuring correctness. Further, the introduction of a background service for automated validation reduces manual effort and ensures consistent, ongoing validation of data integrity.
- Flexibility: The validation system supports different approaches for handling updated rows, allowing for optimization based on specific use cases and performance requirements.
- Compatibility with Change Tracking: The validation process can be customized to include change tracking metadata columns, ensuring comprehensive validation for tables with change tracking enabled.
- Efficient Comparison: The use of hash aggregates for comparing large datasets enables efficient validation without the need to compare individual rows. In an example, if an inconsistency is detected in a large dataset, a mechanism is provided to drill the large partition down further to exactly find the rows that are inconsistent, which is accomplished without leaking customer data.
- Fallback Mechanism: The subject system includes a fallback mechanism to prevent excessive historical validation, optimizing the validation process for existing tables.
- Integration with Existing Systems: The validation approach integrates with the aforementioned Data Consistency Service (DCS), leveraging established infrastructure while introducing additional capabilities.

The aforementioned features collectively contribute to a robust, computationally efficient, and flexible validation system that supports the utilization of bitsets for DML while maintaining data integrity and minimizing impact on customer operations.

In all validation phases, UPDATE, DELETE, or MERGE operations may cause some partitions to be written twice: once using the traditional Copy on Write (CoW) method and once using the new delta approach. The decision to write a single partition or a partition pair is made at runtime using a probabilistic method. This approach aims to create a random sample across all written partitions.

In the below discussion, partitions written using the Copy on Write (CoW) method are referred to as CoW partitions. A CoW partition, for example, includes a single complete micro-partition file that encompasses all data for every row.

Partitions written using the delta approach are denoted as combined partitions. This is because such combined partitions include two micro-partition files:

- A delta micro-partition file which contains only a deleted bitset
- The full micro-partition file the delta micro-partition file points to as its root file.

The following discussion relates to file registration and file access information.

The validation phases can differ in how partitions are registered and used and discussed in the following:

Partition Registration:

- Partitions used for customer queries are registered as added partitions in EP files.
- Validation-only partitions have their file access information stored in a hidden column EP of the EP file.

File Access Information:

- For customer query partitions: Stored in the usual added partitions header field of the EP file.
- For validation-only partitions: Stored in a dedicated hidden column EP, making them "invisible" to existing components that retrieve table partitions.

Hidden Column EP:

- Identified by FASTER_DML_VALIDATION_HIDDEN_COLUMN_ID in SpecialColumnSourceIdEnum.
- Contains encoded file access information and partition type (CoW or combined).
- Uses a serialized Protobuf object instead of a Column Lean EP.

Validation Partition Management:

- Scheduled for deletion after a number of days (e.g., 7 days, and the like).

Detectable by a LeakedFileDetector component if not deleted, identifiable by a specific suffix.

Not reported as leaked until older than a threshold time period (e.g., 60 days, and the like).

This approach allows for selective visibility and management of partitions based on their purpose in the validation process.

The rollout process for validating the disclosed implementation involves multiple phases, each characterized by the following key elements:

Dual Insert Operators:

Two insert operators are present in the query plan: delta InsertRSO and Copy-on-Write (CoW) InsertRSO.

The delta InsertRSO writes delta files.

The CoW InsertRSO writes CoW files.

File Registration:

During file registration, a decision is made regarding which file (delta or CoW) becomes the primary file for serving customer queries.

The non-primary file is designated for validation purposes.

Phased Approach:

Initial Phases: CoW files are used as the primary files for customer queries, while delta partitions are employed for validation.

Later Phases: Delta files become the primary files for customer queries, with CoW files used for background validation.

This phased validation strategy allows for a gradual transition while maintaining data integrity and minimizing impact on customer operations.

Figure 8:
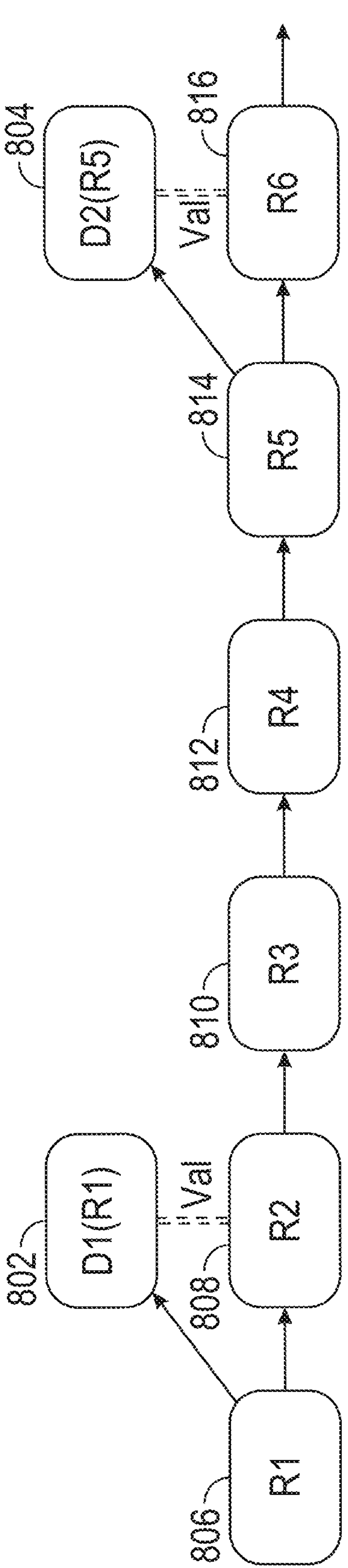
FIG. 8 illustrates a first phase of validation, in accordance with an embodiment of the subject technology.

FIG. 8 illustrates a first phase of validation, in accordance with an embodiment of the subject technology.

In an implementation, a first phase (COW) provides the following:

CoW partitions are registered as added partitions and used for serving customer queries.

Combined partitions (written using the new approach) are stored in a hidden column EP of an EP file for validation purposes.

File access information for combined partitions is not visible to existing components that retrieve table partitions.

In the example of FIG. 8, CoW files continue to be written and registered as the primary files for answering customer queries.

Concurrently, delta files are written for validation purposes. The process is illustrated in FIG. 8:

The x-axis denotes time progression

Each box symbolizes a partition

Vertically aligned boxes represent partitions of the same table version

Lower boxes indicate root files (e.g., root file 806, root file 808, root file 810, root file 812, root file 814, root file 816)

Upper boxes represent combined partitions (e.g., combined partition 802, combined partition 804).

R1, R2, R3, R4, R5 and R6 (e.g., root file 806, root file 808, root file 810, root file 812, root file 814, root file 816, respectively) are CoW partitions which are registered as added partitions D1(R1) and D2(R5) (e.g., combined partition 802, combined partition 804) are combined partitions whose file access information are stored in the hidden column EP for validation purposes This approach allows for the continued use of CoW techniques for customer-facing operations while simultaneously generating delta files to validate the implementation.

Customer queries will be served from the sequence of root files R1, R2, and so on, while each file is validated against its corresponding combined partition.

In an example, delta files are not generated for every root file. Delta files are only written when there are sufficient resources available for validation, as managed by the validation service (e.g., validation service 111) through the previously described mechanism.

Consequently, there may be sequences of root files (R . . . ) between delta files that do not branch into a delta file.

Figure 9:
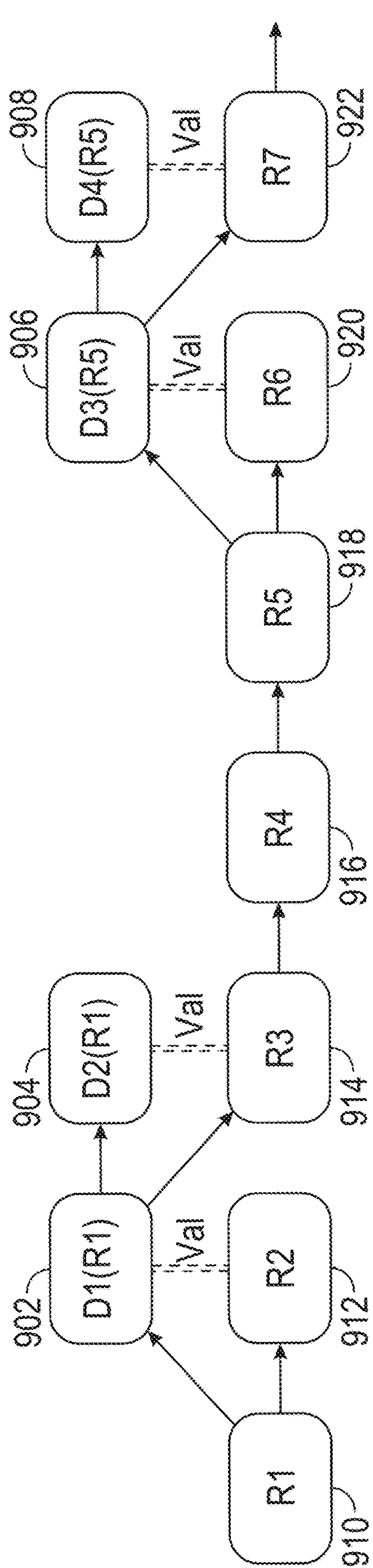
FIG. 9 illustrates a second phase of validation, in accordance with an embodiment of the subject technology.

FIG. 9 illustrates a second phase of validation, in accordance with an embodiment of the subject technology.

In an implementation, a second phase (SNAKE) includes the following as shown in FIG. 9:

CoW partitions and combined partitions are alternately registered as primary partitions.

The non-primary partition (either CoW or combined) is stored in the hidden column EP for validation.

root file 910 corresponding to R1, root file 914 corresponding to R3, root file 916 corresponding to R4, root file 918 corresponding to R5 and root file 922 corresponding to R7 are CoW partitions which are registered as an added partition combined partition 902 corresponding to D1(R1) and combined partition 906 corresponding to D3(R5) are combined partitions which are registered as added partitions root file 912 corresponding to R2 and root file 920 corresponding to R6 are CoW partitions whose file access information is stored in the hidden column EP for validation purposes combined partition 904 corresponding to D2(R1) and combined partition 908 corresponding to D4(R5) are combined partitions whose file access information is stored in the hidden column EP for validation purposes In this phase as mentioned above, an alternation occurs between registering combined partitions and root partitions as the primary partition.

Continuing the example above, the combined partitions 902 corresponding to D1(R1) and combined partition 906 corresponding to D3(R5) are utilized to answer customer queries, leveraging the validation of this mechanism from the previous phase.

Concurrently, writing and validating stacked combined partitions D2(R1) (e.g., combined partition 904) and D4(R5) (e.g., combined partition 908) occurs (without relying on their correctness during this phase).

This phase is crucial as it tests the correct scanning of stacked combined partitions. It follows a proof-by-induction approach:

1. Prove that writing a single delta file works correctly.
2. Prove that given a working delta file mechanism, it is possible to stack another combined partition on top of it.

In an example, delta files do not reference other delta files. Each new delta file in a sequence replaces the previous one, incorporating all changes, and refers to the same root file. For instance, both D1(R1) (e.g., combined partition 902) and D2(R1) (e.g., combined partition 904) reference R1 as their root file, with D2 including all rows marked in D1's bitset.

As in the COW phase, delta files are only written when resources are available for validation. When a delta file (e.g., D1(R1)) is written, writing the corresponding validation partition D2(R1) is performed, unless prevented by functional heuristics (e.g., if too many rows are deleted in the subsequent DML). Between validation files, there may be sequences of root files without delta or validation files.

Figure 10:
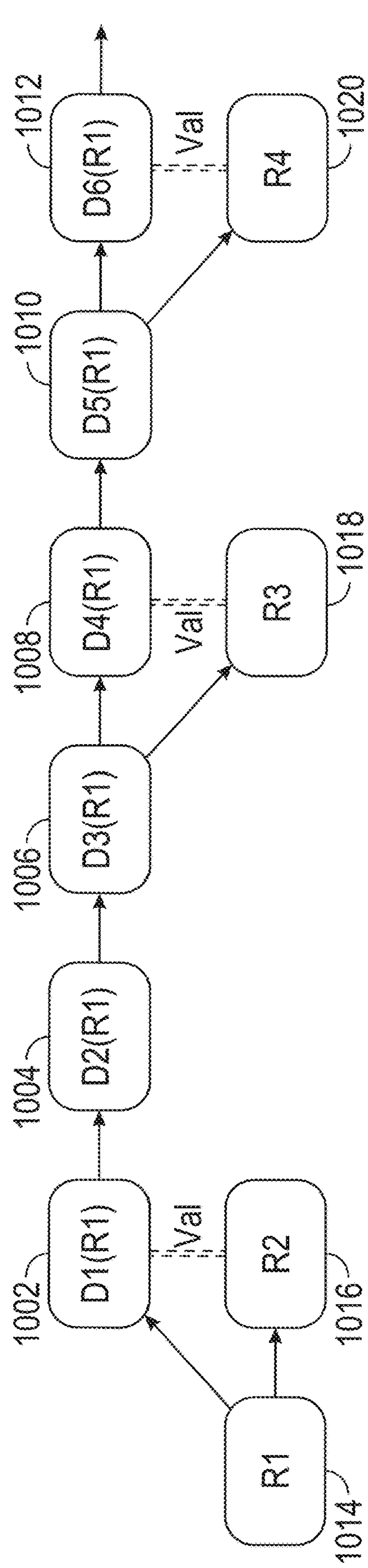
FIG. 10 illustrates a third phase of validation, in accordance with an embodiment of the subject technology.

FIG. 10 illustrates a third phase of validation, in accordance with an embodiment of the subject technology.

In this phase, combined partitions created using the delta file approach serve as the primary source for customer queries and are registered as added partitions in the EP file header.

Copy-on-Write (CoW) partitions, with the exception of root partitions that delta files are based on, are written using the CoW approach. These CoW partitions are created from the most recent combined partition solely for validation purposes and as a potential fallback mechanism. The file access information for these CoW partitions is not stored in the usual location but instead in a hidden column EP within the EP file.

This approach allows for the full implementation of utilizing delta files for customer-facing operations while maintaining a validation mechanism through the CoW partitions. By storing the CoW partition information in a hidden column, the subject system can maintain these validation partitions without interfering with normal operations or being visible to components that typically access table partitions.

A third phase (DELTA) illustrated in FIG. 10 provides the following:

- Combined partitions (written using the delta file approach) are registered as primary partitions and used for serving customer queries.
- CoW partitions are written only for validation purposes and potential fallback.
- File access information for CoW partitions (except for root partitions) is stored in the hidden column EP of the EP file.
- Root file 1014 corresponding to R1 is a CoW partition that is registered as an added partition
- Combined partition 1002 corresponding to D1(R1), combined partition 1004 corresponding to D2(R1), combined partition 1006 corresponding to D3(R1), combined partition 1008 corresponding to D4(R1), combined partition 1010 corresponding to D5(R1), and combined partition 1012 corresponding to D6(R1) are combined partitions which are registered as added partitions.
- Root file 1016 corresponding to R2, root file 1018 corresponding to R3, and root file 1020 corresponding to R4 are CoW partitions whose file access information is stored in the hidden column EP for validation purposes.

In this phase, as mentioned above, delta files are consistently registered as the primary files for answering customer queries.

All queries generate delta files for eligible partitions. When the validation service (e.g., validation service 111) has available capacity, a CoW file is also written for validation purposes. This approach allows for the full implementation of the subject system while maintaining ongoing validation capabilities.

In this phase, all customer queries are answered using the aforementioned combined partitions.

Unlike previous phases (e.g., first phase and second base discussed previously), Copy-on-Write (CoW) files for validation are written only for a subset of steps, based on a probability designed to maintain an acceptable load on the validation service.

This sample-based validation approach allows for continued background validation over an extended period, even as customers effectively use the new feature.

During this time, in an implementation, a virtual warehouse per deployment can run a process to continuously check for errors. This process maintains an automatic ratio of validation file writing in an example.

A validation process using delta files, updated row files, and root files (e.g., residual files) can occur in several example steps:

1. File Generation and Storage:
   - The original root file containing the unmodified rows
   - A delta file containing the bitset that indicates deleted/updated rows
   - An updated rows file.
   - A CoW version of the new file
2. Validation Process:
   - The subject system checks that 1) the original root file containing the unmodified rows and 2) the delta file containing the bitset that indicates deleted/updated rows, is equal to the CoW version of the new file
3. Hash-Based Comparison:
   - A hash aggregate (e.g., hash value) is generated for the combined partition (resulting from applying the bitset from the delta file on the root file)
   - Another hash aggregate (e.g., another hash value) is generated for the CoW file
   - These hash values are compared to validate correctness.
   - If the hash values match, it confirms the data consistency
4. Background Validation:
   - The validation service performs these comparisons in the background.
   - It scans both the primary and validation partitions written during a DML query
   - The service compares results from both scans to detect any discrepancies
   - Any inconsistencies found are reported as alerts
5. File Management:
   - The system maintains file access information for validation files in a hidden column EP
   - Primary files used for customer queries have their information stored in the regular EP file header
   - This separation allows for validation without impacting normal operations FIG. 11 illustrates an example of validation related to the first phase of validation discussed in FIG. 8, in accordance with an embodiment of the subject technology.

Figure 11:
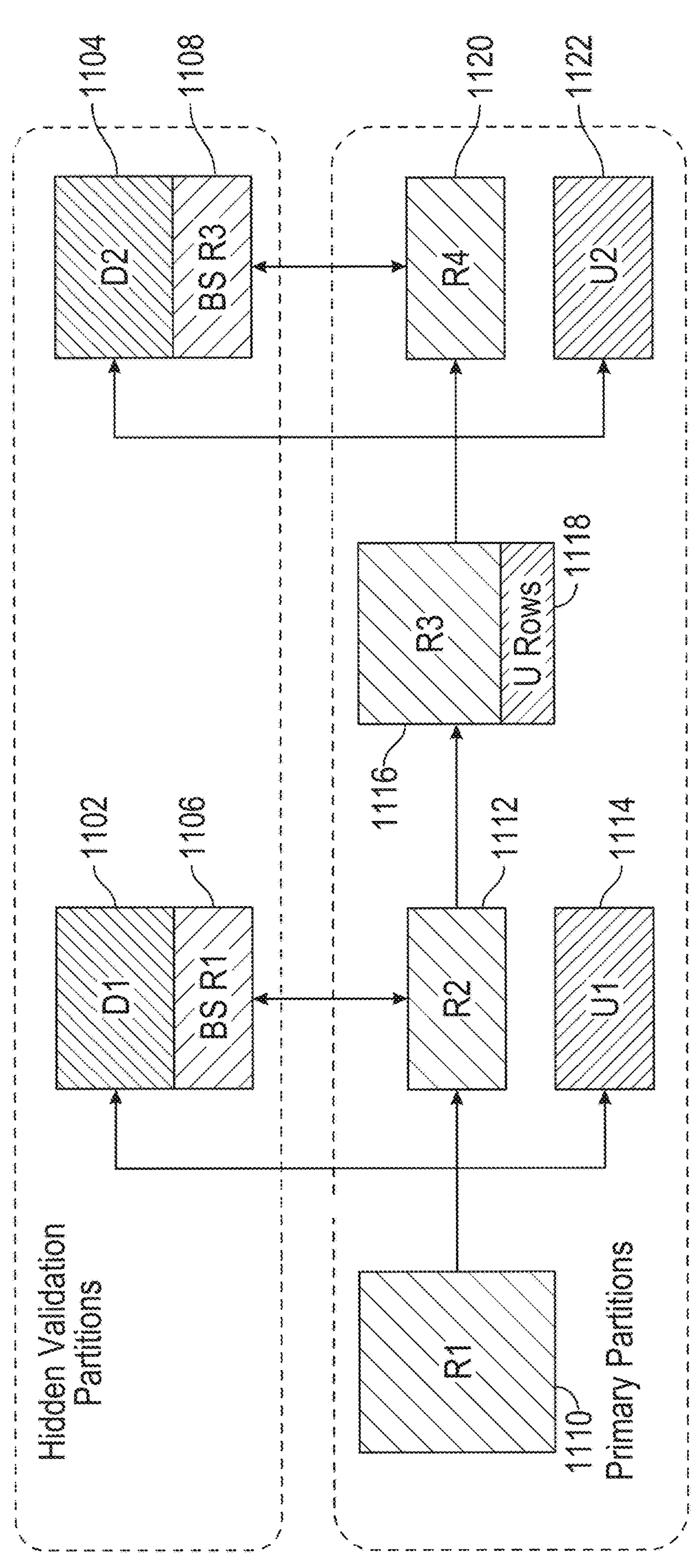
FIG. 11 illustrates an example of validation related to the first phase of validation discussed in FIG. 8, in accordance with an embodiment of the subject technology.

In the example of FIG. 11, a set of primary partitions includes root file 1110, root file 1112, updated rows file 1114, root file 1116, updated rows 1118, root file 1120, and updated rows file 1122. A set of hidden validation partitions includes delta file 1102 that also includes bitset 1106, and delta file 1104 that also includes bitset 1108.

As shown, after root file 1110 is modified (e.g., by executing a given DML statement), root file 1112 and updated rows file 1114 (e.g., separate files) are generated where updated rows file 1114 represents a set of rows that have been updated from root file 1110, and root file 1112 represents a remainder set of rows that were not updated from root file 1110. In an example, any row that was deleted is indicated using a bitset, and any row that was updated is not included (e.g., deleted) in root file 1112. As mentioned herein, such a file as root file 1112 may be referred to as a residual file (e.g., including the remainder or remaining set of rows that were not updated from executing a given DML statement).

In the set of hidden validation partitions, delta file 1102 and bitset 1106 (e.g., indicating which row(s) were updated along with which row(s) were not updated) are provided. In an embodiment, delta file 1102 includes bitset 1106. In the example of FIG. 11, validation service 111 can validate root file 1112 by generating, using delta file 1102, a set of rows that were not updated and comparing such rows to the set of rows from root file 1112 as both sets of rows should match.

Continuing to root file 1116 and updated rows 1118, a subsequent DML statement is performed on root file 1112 and DML engine 109 generates root file 1116 that includes updated rows 1118 (e.g., in the same file). For root file 1116, DML engine 109 determines that no validation is to be performed in this example.

Next, DML engine 109 determines that validation is to be performed after a DML statement is performed on root file 1116. DML engine 109 generates root file 1120 and updated rows file 1122 where updated rows file 1122 represents a set of rows that have been updated from root file 1116, and root file 1120 represents a remainder set of rows that were not updated from root file 1116.

In the set of hidden validation partitions, delta file 1104 is provided, which includes bitset 1108. Next, validation service 111 can validate root file 1120 by generating, using delta file 1104, a set of rows that were not updated and comparing such rows to the set of rows from root file 1120 as both sets of rows should match.

Figure 12:
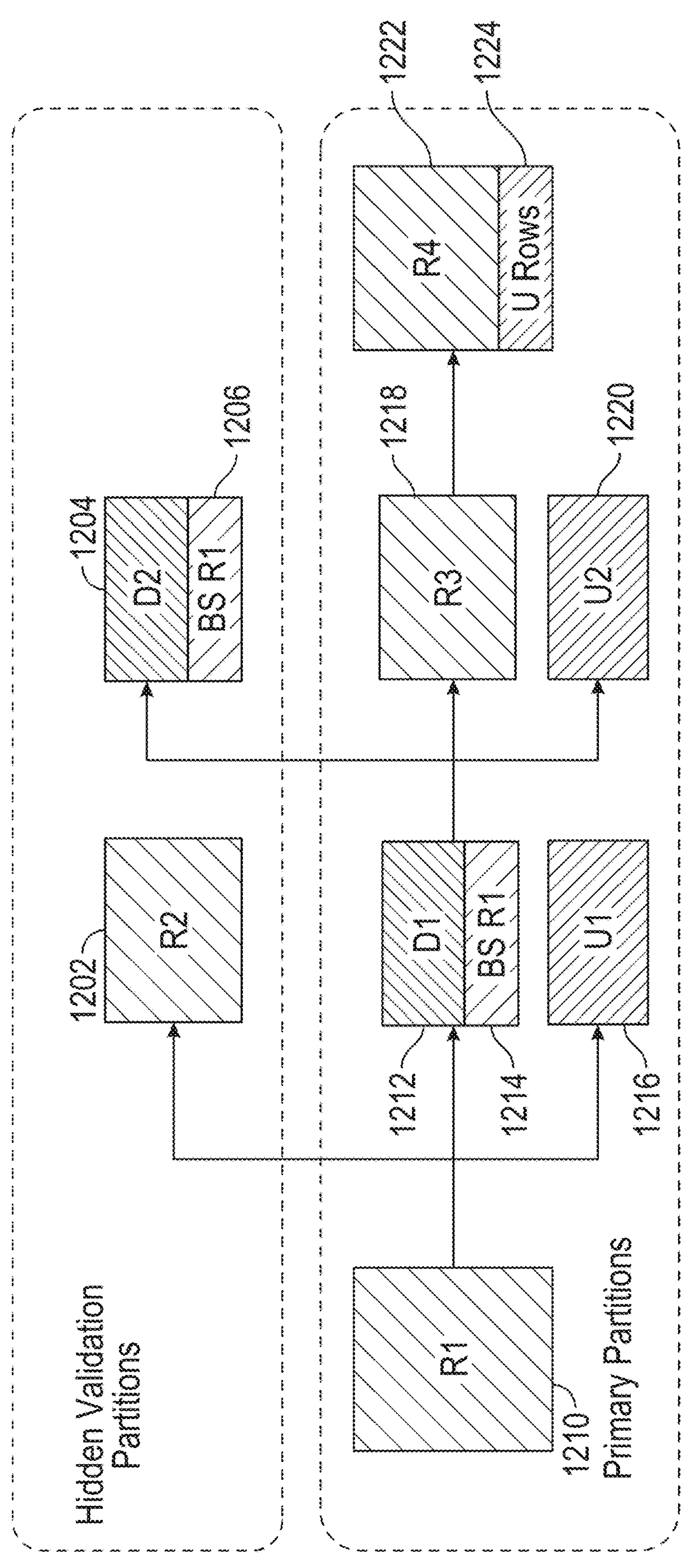
FIG. 12 illustrates an example of validation related to the second phase of validation discussed in FIG. 9, in accordance with an embodiment of the subject technology.

FIG. 12 illustrates an example of validation related to the second phase of validation discussed in FIG. 9, in accordance with an embodiment of the subject technology.

In the example of FIG. 12, a set of primary partitions includes root file 1210, delta file 1212, updated rows file 1216, root file 1218, updated rows file 1220, and root file 1222. A set of hidden validation partitions includes root file 1202, delta file 1204, and bitset 1206.

As shown, after root file 1210 is modified (e.g., by executing a given DML statement), DML engine 109 generates delta file 1212 and updated rows file 1216. In this example, delta file 1212 includes bitset 1214 (e.g., indicating which row(s) were updated along with which row(s) were not updated), and updated rows file 1216 includes a set of rows that were updated from root file 1210.

In the set of hidden validation partitions, root file 1202 represents a remainder set of rows that were not updated from root file 1210. Next, root file 1202 is compared with delta file 1212 by validation service 111 to validate that the DML statement executed correctly.

Continuing to root file 1218, which represents a set of rows that were not modified (e.g., not deleted, updated, and the like) after executing a DML statement on delta file 1212, DML engine 109 generates updated rows file 1220 (which is separate from root file 1218) that includes a set of updated rows. In this example, root file 1218 represents a remainder set of rows that were not updated. A combination of updated rows file 1216 and updated rows file 1220 represents a combined set of updated rows from root file 1210.

In the set of hidden validation partitions, delta file 1204 includes bitset 1206. Next, validation service 111 can utilize delta file 1204 to validate root file 1218 by generating, using delta file 1204, a set of rows that were not updated and comparing such rows to the set of rows from root file 1218 as both sets of rows should match.

DML engine 109 then determines that no validation is to be performed for a subsequent DML statement. DML engine 109 executes the DML statement and generates root file 1222 where this file includes updated rows 1224 from executing the DML statement along with another set of rows that were not updated from root file 1218.

Figure 13:
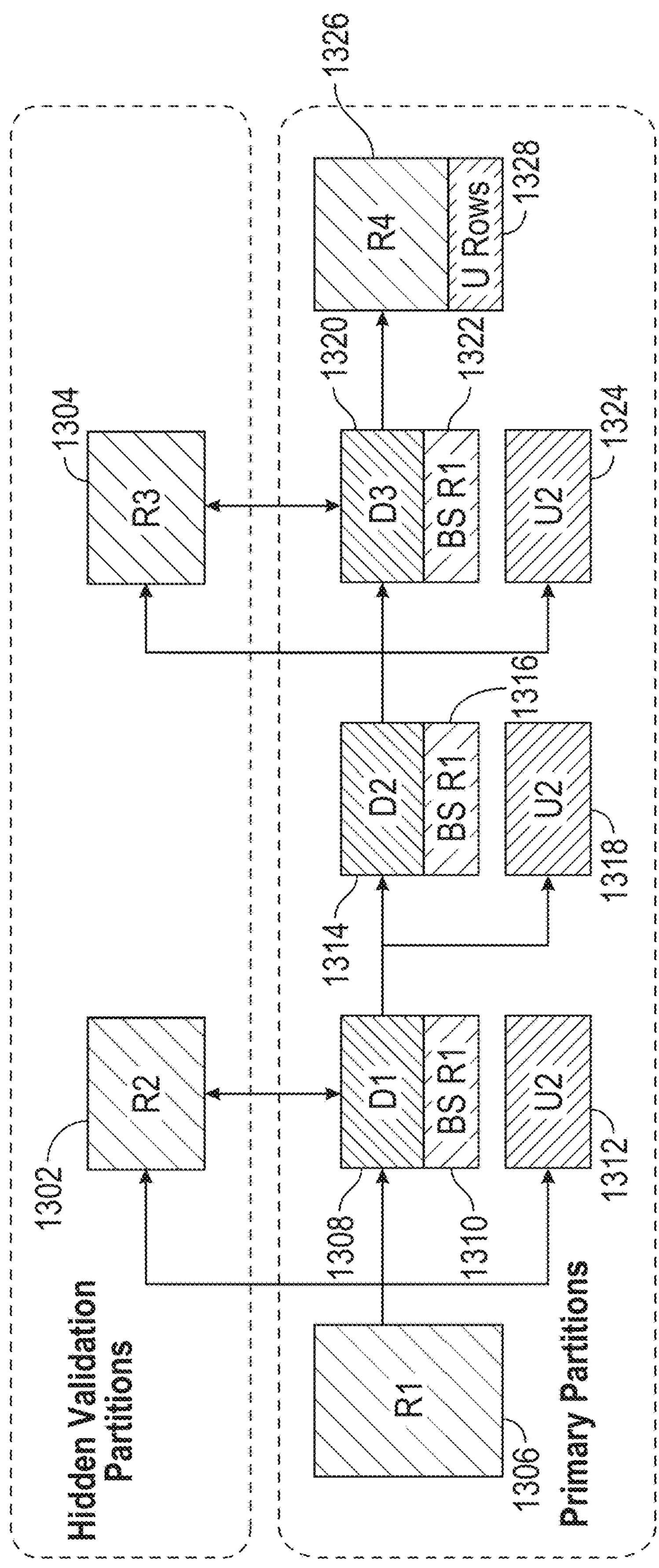
FIG. 13 illustrates an example of validation related to the third phase of validation discussed in FIG. 10, in accordance with an embodiment of the subject technology.

FIG. 13 illustrates an example of validation related to the third phase of validation discussed in FIG. 10, in accordance with an embodiment of the subject technology.

In the example of FIG. 13, a set of primary partitions includes root file 1306, delta file 1308, bitset 1310, updated rows file 1312, delta file 1314, bitset 1316, updated rows file 1318, delta file 1320, bitset 1322, updated rows file 1324, root file 1326, and updated rows 1328. A set of hidden validation partitions includes root file 1302, and root file 1304.

As shown, after root file 1306 is modified (e.g., by some DML statement), DML engine 109 generates delta file 1308 that includes bitset 1310 (e.g., indicating which row(s) were updated along with which row(s) were not updated). Moreover, DML engine 109 generates updated rows file 1312 that represents a set of updated rows from root file 1306.

In the set of hidden validation partitions, a root file 1302 includes a set of rows that were not updated from root file 1306. The root file 1302 is utilized to validate that the DML statement executed correctly in which validation service 111, in an example, compares root file 1302 with delta file 1308 to determine that the same set of row(s) (e.g., corresponding to a set of rows that were not updated from root file 1306) match each other.

Continuing to delta file 1314, this file is generated by DML engine 109 after executing a DML statement based on delta file 1308. DML engine 109 also generates updated rows file 1318, which represents a set of updated rows after executing the DML statement using delta file 1308. In this example, validation is not performed at this point.

Next, DML engine 109 executes a DML statement to generate delta file 1320. Further, DML engine 109 generates updated rows file 1324 that includes a set of updated rows. In the set of hidden validation partitions, a root file 1304 includes a set of rows that were not updated. The root file 1304 is utilized to validate that the DML statement executed correctly in which validation service 111, in an example, compares root file 1304 with delta file 1320 to determine that the same set of row(s) (e.g., corresponding to a set of rows that were not updated from root file 1306) match each other.

DML engine 109 then executes another DML statement based on delta file 1320 to generate root file 1326 after determining that validation is not to be performed. As illustrated, root file 1326 includes updated rows 1328 from executing the DML statement.

The following discussion below generally relates to validation service 111, which in an implementation is a background service or process that performs the operations discussed herein related to validation.

A discussion of a validation query is initially provided.

The following SQL Query can be used to validate the correctness for a certain table (identified by tableName) and a certain table version interval identified by from (exclusive) and to (inclusive).

```
SELECT
cow.METADATA$PARTITION_NAME,
combined.METADATA$PARTITION_NAME, cow.hashVal,
combined.hashVal,
cow.hashVal = combined.hashVal AS sameHash FROM (
(SELECT METADATA$PARTITION_NAME, HASH_AGG(*) AS hashVal
FROM TABLE(VALIDATE_READ_COW_PARTITIONS(tableName, from, to))
GROUP BY METADATA$PARTITION_NAME) cow
JOIN
(SELECT METADATA$PARTITION_NAME,
ANY_VALUE(METADATA$COW_PARTITION_NAME) AS
defDmlPartitionName, HASH_AGG(*) AS hashVal
FROM TABLE(VALIDATE_READ_COMBINED_PARTITIONS(tableName, from,
to))
GROUP BY METADATA$PARTITION_NAME) combined ON
cow.METADATA$PARTITION_NAME =
combined.defDmlPartitionName
)
```

This query validates the correctness by comparing hash aggregates on the rows of the old and new path (i.e., FDN files and read code) on a per partition basis for all partitions of the table in the given interval. More precisely, if sameHash is false, an inconsistency is found.

In an example, a combined partition undergoes a scan in addition with a scanback (instead of a normal table scan) and three hashes are compared. Hence, there is another table function select and another join. By doing so, it can be ensured that a combined partition is properly read with a scanback.

For this purpose the query uses two new table functions:

- VALIDATE_READ_COW_PARTITIONS (tableName, from, to): Reads all rows from the CoW partitions that belong to a validation pair and have been added to table tableName between from (exclusive) and to (inclusive).
- VALIDATE_READ_COMBINED_PARTITIONS (tableName, from, to): Reads all rows from the combined partitions that belong to a validation pair and have been added to table tableName between from (exclusive) and to (inclusive).

This query validates the correctness by comparing hash aggregates on the rows of the micro-partition files and read code on a per partition basis for all partitions of the table in the given interval. More precisely, if sameHash is false, an inconsistency is found.

The disclosed hash aggregate approach can be used for validation in several ways, as described in the following embodiments:

1. Basic Validation Query Structure:
   - The subject system executes a validation SQL query that compares hash aggregates between CoW partitions and combined partitions
   - The comparison is performed on a per-partition basis for all validation partition pairs of a table within a given version interval
2. Hash Aggregate Implementation:
   - The validation process can use HASH_AGG(*) aggregations to compare the contents of partitions
   - For tables with change tracking enabled, the hash aggregate can include additional columns: METADATA$ORIGINAL_PARTITION_NAME, METADATA$ORIGINAL_PARTITION_ROW_NUMBER, and METADATA$ROW_VERSION
3. Efficiency Benefits:
   - Using hash aggregates enables efficient validation of large datasets without needing to compare individual rows
   - The hash comparison approach allows for detecting inconsistencies while maintaining performance
4. Validation Process:
   - The system generates hash aggregates for both the CoW partition and its corresponding combined partition
   - These hash values are compared to determine if the partitions contain identical data
   - If the hash values don't match (sameHash is false), an inconsistency is detected
5. Implementation Details:
   - The validation query joins results from two table functions: VALIDATE_READ_COW_PARTITIONS and VALIDATE_READ_COMBINED_PARTITIONS
   - Each function produces hash aggregates grouped by partition name.
   - The results are compared using an equality check between the hash values The hash aggregate approach provides an efficient mechanism for validating data consistency while minimizing the computational overhead of comparing large datasets directly.

The following discussion relates to extracting partition pairs from EP (e.g., metadata) files.

The validation service creates:

- the micro-partition file list for the TABLESCAN node that scans the CoW partitions
- the micro-partition file list for the TABLESCAN node that scans the combined partitions
- the VALUES node whose rows are used to obtain METADATA$COMBINED_PARTITION_NAME in VALIDATE_READ_COW_PARTITIONS and METADATA$COW_PARTITION_NAME in VALIDATE_READ_COMBINED_PARTITIONS For the above, the validation service builds partition pairs (partitionPairs). More precisely, the validation service extracts a list that contains all validation partition pairs (i.e., pairs of CoW partitions and their corresponding combined partitions) that belong to table versions between from and to from the EP files of the table (table) identified by tableName. In an example, due to our probabilistic sampling, there is not a validation partition for each "normally" registered primary partition.

As a first step, the validation service first retrieves a list of all delta EP files (deltaEpFiles) that belong to table versions between from and to using EpFile.getDeltaEpFiles (table, to, from).

Next, deltaEpFiles is pruned to prunedDeltaEpFiles using the CONTAIN_FASTER_DML_VALIDATION_FILE EP file flag which denotes if hidden column EP is present for at least one micro-partition file registered as assed in the delta EP file and thus if there is at least one validation pair in the delta EP file. This EP file flag is set before flushing the delta EP file after one or multiple file registrations.

The pruned delta EP file list is then iterated using an implementation of the EpFileIterator. For each delta EP file (deltaEpFile) of the list, the validation service iterates through the instances of our dedicated hidden column EP of all micro-partition files that are registered as added partitions in the delta EP file. This is done by calling binaryCtx.getColEPs(SpecialColumnSourceIdEnum.FASTER_DML_VALIDATION_HIDDEN_COLUMN_ID. getColSrcId( ), deltaEpFile.getStartFileld( ), deltaEpFile.getEndFileId( )). The hidden column EP for all added partitions is not retrieved but only for those where the sampling mechanism decided to write a validation partition.

For each hidden column EP that the validation service iterates over, the validation service decodes the encoded file access information and uses them to create an ImmutableBaseFile object representing the validation partition (validationPartition). Subsequently, the ImmutableBaseFile object representing the corresponding normally registered primary partition (primaryPartition) is created using File.cpFileUnpack( . . . ) and the identifier of the micro-partition file the current hidden column EP belongs to. Finally, the validation service uses the information whether the validation partition is a CoW or combined partition to create the validation partition pair and add it to the partitionPairs list.

After iterating through all hidden column EPs of all delta EP files in prunedDeltaEpFiles, partitionPairs contains all validation partition pairs.

The following discussion relates to automatic background validation.

In order to automate the execution of the manual validation SQL query for all tables with the appropriate table version intervals, a new background service is provided, which can provide the following:

- introduce a background validation task that executes the validation SQL query for a given table and table version interval
- schedule this task automatically for a table whenever it is compacted (and some additional requirements are met, see below)

In an implementation, the background validation task is provided by a compute service manager.

In an implementation, a table version is stored that is used as the to (i.e., inclusive table version interval end) in a validation query as the watermark and use it as the from (i.e., exclusive table version interval end) in the next validation query for the same table.

In an implementation, the background validation tasks execute the validation query described above.

The following discussion relates to a VALIDATION_QUERY (e.g., validation query discussed above) implementation.

The stored procedure first builds the SQL text for the validation query. Then the query is executed by calling EXECUTE IMMEDIATE sqlText.

Subsequently, a cursor is defined on the resultset that the execution of the query returned. This cursor is used to iterate over the resultset and check for each row (i.e., validation pair) if the hash aggregate for the CoW partition is equal to the hash aggregate of the combined partition (i.e., if sameHash is true). If this is not the case, an inconsistency is found and reported by calling SYSTEMSFASTER_DML_VALIDATION_REPORT_INCONSISTENCY(tableId, from, to, checkChangeTrackingColumns, cowPartitionName, combinedPartition Name). When called, this system function creates a non-fatal incident with faster_dml_validation_inconsistent_hash_found as the signature.

When an inconsistency is found, a set of investigation queries are executed to get additional information (e.g., which rows are missing in the combined partition but are present in the CoW partition), and then the aforementioned reporting system function is called with a few more arguments/information.

After finishing the iteration, the cursor is closed and the resultset of the validation query is returned as the result of the stored procedure. While the result is ignored in the task, it is helpful for debugging when calling the stored procedure manually.

The following relates to scheduling validation task(s).

In an example, validation task instances are created by reading tables from a compacted tables queue (e.g., tables designated for compaction by a compaction process). There is no sampling or throttling in the background validation task generation described herein. The reason for that is that the sampling/throttling is controlled during the validation file generation.

In an example, a background validation task for each compacted table is created and scheduled if the following requirements are met:

- ENABLE_SCHEDULING_FASTER_DML_VALIDATION_TASKS_IN_COMPACTION_TASK_BG=true.
- ENABLE_AUTOMATIC_FASTER_DML_BACKGROUND_VALIDATION_TASK_GEN ERATION=true for the table.
- There is no background validation requested/in-progress for the table.
- The last background validation for the table finished at least a minimum period of time ago (e.g., interval of an arbitrary amount of seconds, and the like).
- There is at least one validation pair in the table version interval which the task will cover. This uses a flag in the EP DPO.
- The table type is supported (i.e., no mixed table, iceberg table, etc.)

Figure 14:
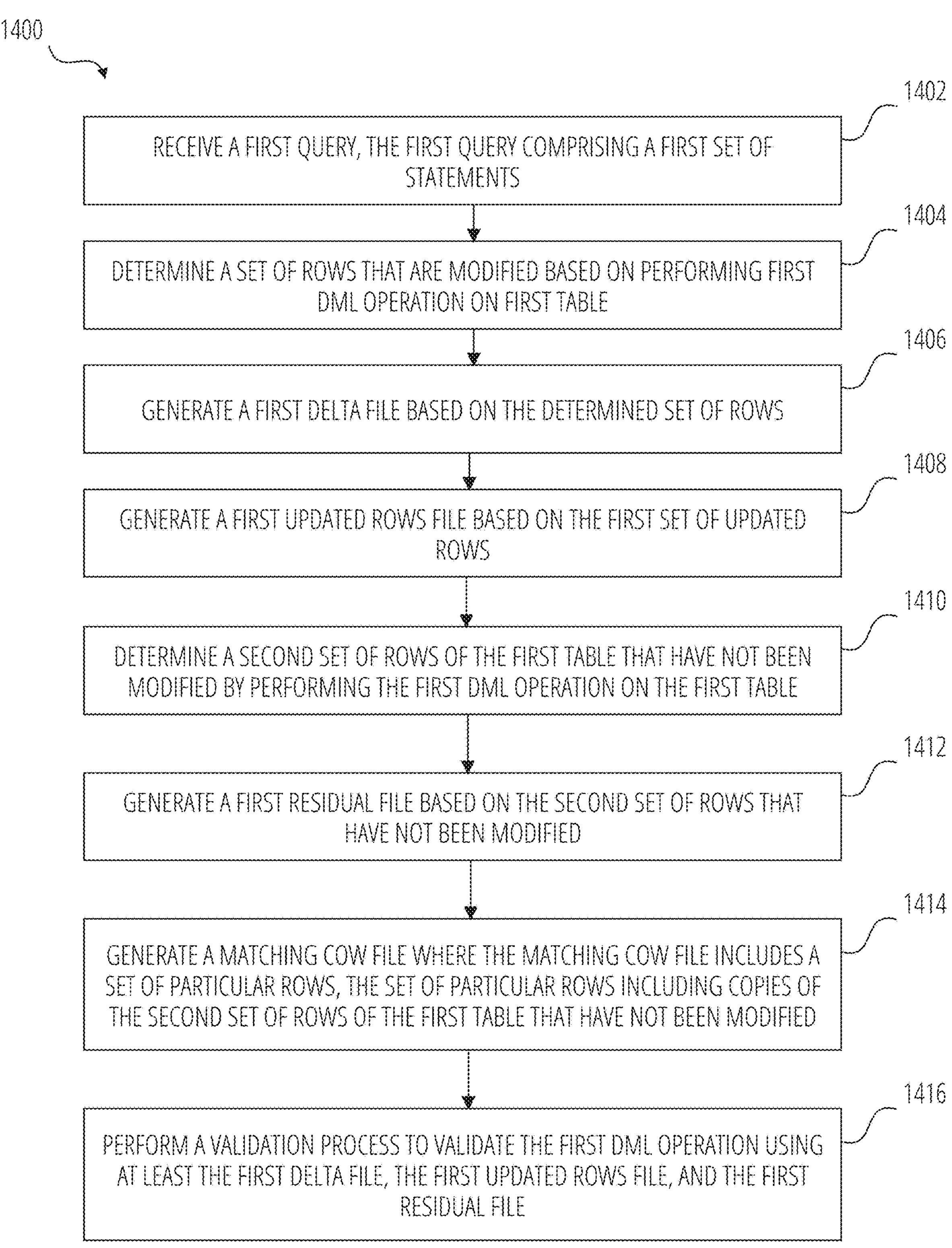
FIG. 14 is a flow diagram illustrating operations of a database system in performing a method, in accordance with some embodiments of the present disclosure.

FIG. 14 is a flow diagram illustrating operations of a database system in performing a method, in accordance with some embodiments of the present disclosure. The method 1400 may be embodied in computer-readable instructions for execution by one or more hardware components (e.g., one or more processors) such that the operations of the method 1400 may be performed by components of data platform 102. Accordingly, the method 1400 is described below, by way of example with reference thereto. However, it shall be appreciated that method 1400 may be deployed on various other hardware configurations and is not intended to be limited to deployment within the data platform 102.

At operation 1402, DML engine 109 receives a first query, the first query comprising a first set of statements, the first set of statements including at least a first statement for performing a first Data Manipulation Language (DML) operation on a first table.

At operation 1404, DML engine 109 determines a set of rows that are modified based on performing the first DML operation on the first table, the set of rows including a first set of updated rows. In an example, the set of rows can include a set of deleted rows alone, or a set of deleted rows along with updated or modified rows that were not deleted.

At operation 1406, DML engine 109 generates a first delta file based on the determined set of rows, the first delta file comprising a first bitset to indicate a particular set of rows of the first table that have been deleted or updated, and a first set of updated rows.

At operation 1408, DML engine 109 generates a first updated rows file based on the first set of updated rows.

At operation 1410, DML engine 109 determines a second set of rows of the first table that have not been modified by performing the first DML operation on the first table.

At operation 1412, DML engine 109 generates a first residual file based on the second set of rows that have not been modified.

At operation 1414, DML engine 109 generates a matching CoW file where the matching CoW file includes a set of particular rows, the set of particular rows including copies of the second set of rows of the first table that have not been modified.

At operation 1416, DML engine 109 performs a validation process to validate the first DML operation using at least the first delta file, the first residual file, and the matching CoW file.

Figure 15:
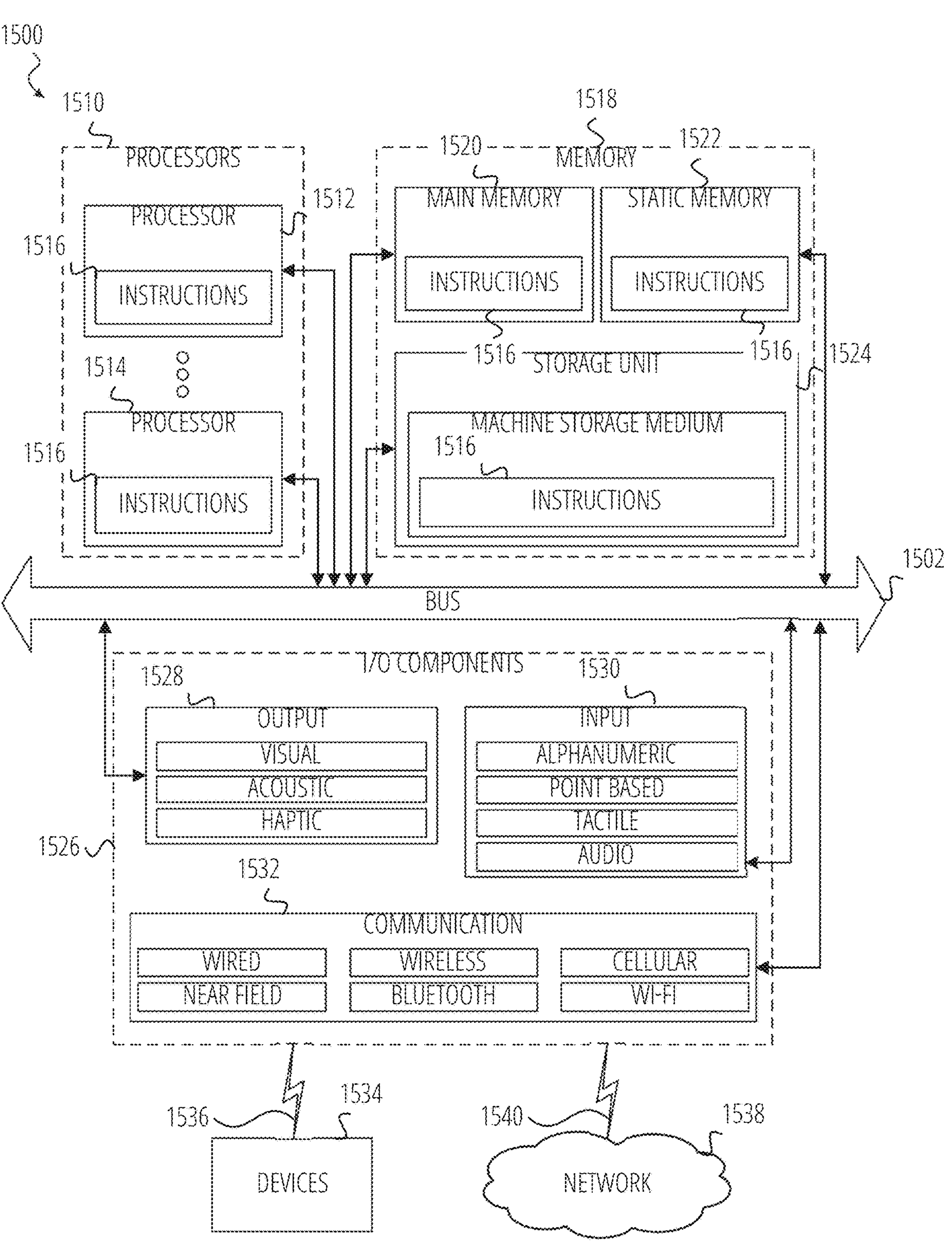
FIG. 15 illustrates a diagrammatic representation of a machine in the form of a computer system within which a set of instructions may be executed for causing the machine to perform any one or more of the methodologies discussed herein, in accordance with some embodiments of the present disclosure.

FIG. 15 illustrates a diagrammatic representation of a machine 1500 in the form of a computer system within which a set of instructions may be executed for causing the machine 1500 to perform any one or more of the methodologies discussed herein, according to an example embodiment. Specifically, FIG. 15 shows a diagrammatic representation of the 1800 in the example form of a computer system, within which instructions 1516 (e.g., a software, a program, an application, an applet, an app, or other executable code) for causing the machine 1500 to perform any one or more of the methodologies discussed herein may be executed. For example, the instructions 1516 may cause the machine 1500 to execute any one or more operations of the method(s) described before. As another example, the instructions 1516 may cause the machine 1500 to implement any one or more portions of the functionality illustrated in any one of at least some of the figures described herein. In this way, the instructions 1516 transform a general, non-programmed machine into a particular machine that is specially configured to carry out any one of the described and illustrated functions of the data platform 102 such as the compute service manager 108 (or a component thereof such as the DML engine 109) or an execution node of the execution platform 110.

In some embodiments, the machine 1500 operates as a standalone device or may be coupled (e.g., networked) to other machines. In a networked deployment, machine 1500 may operate in the capacity of a server machine or a client machine in a server-client network environment or as a peer machine in a peer-to-peer (or distributed) network environment. The machine 1500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 includes processors 1510, memory 1518, and i/o components 1526 configured to communicate with each other such as via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1512 and a processor 1514 that may execute the instructions 1516. The term "processor" is intended to include multi-core processors 1510 that may comprise two or more independent processors (sometimes referred to as "cores") that may execute instructions 1516 contemporaneously. Although FIG. 15 shows multiple processors 1510, the machine 1500 may include a single processor with a single core, a single processor with multiple cores (e.g., a multi-core processor), multiple processors with a single core, multiple processors with multiple cores, or any combination thereof.

The memory 1518 may include a main memory 1520, a static memory 1522, and a storage unit 1524, all accessible to the processors 1510 such as via the bus 1502. The main memory 1520, the static memory 1522, and the storage unit 1524 store the instructions 1516 embodying any one or more of the methodologies or functions described herein. The instructions 1516 may also reside, completely or partially, within the main memory 1520, within the static memory 1522, within the storage unit 1524, within at least one of the processors 1510 (e.g., within the processor's cache memory), or any suitable combination thereof, during execution thereof by the machine 1500.

The i/o components 1526 include components to receive input, provide output, produce output, transmit information, exchange information, capture measurements, and so on. The specific i/o components 1526 that are included in a particular machine 1500 will depend on the type of machine. For example, portable machines such as mobile phones will likely include a touch input device or other such input mechanisms, while a headless server machine will likely not include such a touch input device. It will be appreciated that the i/o components 1526 may include many other components that are not shown in FIG. 15. The i/o components 1526 are grouped according to functionality merely for simplifying the following discussion and the grouping is in no way limiting. In various example embodiments, the i/o components 1526 may include output components 1528 and input components 1530. The output components 1528 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The i/o components 1526 may include communication components 1532 operable to couple the machine 1500 to a network 1538 or devices 1534 via a coupling 1540 and a coupling 1536, respectively. For example, the communication components 1532 may include a network interface component or another suitable device to interface with the network 1538. In further examples, the communication components 1532 may include wired communication components, wireless communication components, cellular communication components, and other communication components to provide communication via other modalities. The devices 1534 may be another machine or any of a wide variety of peripheral devices (e.g., a peripheral device coupled via a universal serial bus (USB)). For example, as noted above, the machine 1500 may correspond to any one of the compute service manager 108, the execution platform 110, and the devices 1534 may include the data store 206 or any other computing device described herein as being in communication with the data platform 102 or the data storage 104.

The various memories (e.g., memory 1518, main memory 1520, static memory 1522, and/or memory of the processor(s) processors 1510 and/or the storage unit 1524) may store one or more sets of instructions 1516 and data structures (e.g., software) embodying or utilized by any one or more of the methodologies or functions described herein. These instructions 1516, when executed by the processor(s) processors 1510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 1538 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1538 or a portion of the network 1538 may include a wireless or cellular network, and the coupling 1540 may be a Code Division Multiple Access (CDMA) connection, a Global System for Mobile communications (GSM) connection, or another type of cellular or wireless coupling. In this example, the coupling 1540 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1516 may be transmitted or received over the network 1538 using a transmission medium via a network interface device (e.g., a network interface component included in the communication components 1532) and utilizing any one of a number of well-known transfer protocols (e.g., hypertext transfer protocol (HTTP)). Similarly, the instructions 1516 may be transmitted or received using a transmission medium via the coupling 1536 (e.g., a peer-to-peer coupling) to the devices 1534. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

at least one hardware processor; and at least one memory storing instructions that cause the at least one hardware processor to perform operations comprising:

receiving a first query, the first query comprising a first set of statements, the first set of statements including at least a first statement for performing a first Data Manipulation Language (DML) operation on a first table;

determining a set of rows that are modified based on performing the first DML operation on the first table, the set of rows including a first set of updated rows;

generating a first delta file based on the determined set of rows, the first delta file comprising a first bitset to indicate a particular set of rows of the first table that have been deleted or updated, and a first set of updated rows;

generating a first updated rows file based on the first set of updated rows;

determining a second set of rows of the first table that have not been modified by performing the first DML operation on the first table;

generating a first residual file based on the second set of rows that have not been modified; and performing a validation process to validate the first DML operation using at least the first delta file, the first residual file, and a matching Copy on Write (CoW) file.

2. The system of claim 1, wherein performing the validation process comprises:

comparing a first particular set of rows generated based on the first delta file and the first residual file with a particular set of rows from the matching CoW file; and determining whether the first particular set of rows matches the particular set of rows.

3. The system of claim 1, wherein performing the validation process comprises:

generating a first hash aggregate for a combined partition resulting from applying a bitset from the first delta file to the first residual file;

generating a second hash aggregate for the matching CoW file; and comparing the first hash aggregate and the second hash aggregate to validate correctness of the first DML operation.

4. The system of claim 1, wherein the operations further comprise:

storing file access information for a validation file in a hidden column of an expression property (EP) file; and storing file access information for the first residual file in a header field of the EP file.

5. The system of claim 1, wherein the operations further comprise:

scheduling deletion of validation files after a configurable time interval; and identifying leaked validation files using a validation file specific suffix.

6. The system of claim 1, wherein performing the validation process comprises:

executing a validation query that performs a comparison using rows from the first delta file and the first residual file against a particular set of rows from the matching CoW file; and reporting any inconsistencies detected during the comparison.

7. The system of claim 1, wherein the operations further comprise:

determining whether to generate validation files based on available computing resources; and controlling a rate of validation file generation using a probability parameter.

8. The system of claim 1, wherein the first DML operation comprises one of:

a delete operation;

an update operation; or a merge operation.

9. The system of claim 1, wherein performing the validation process comprises:

validating change tracking metadata columns when the first table has change tracking enabled.

10. The system of claim 1, wherein the operations further comprise:

automatically controlling a validation file generation rate through a validation service;

decreasing a probability of writing new validation files when validation service load exceeds an accepted load;

increasing the probability when the validation service has available capacity.

11. A method comprising:

receiving a first query, the first query comprising a first set of statements, the first set of statements including at least a first statement for performing a first Data Manipulation Language (DML) operation on a first table;

determining a set of rows that are modified based on performing the first DML operation on the first table, the set of rows including a first set of updated rows;

generating a first delta file based on the determined set of rows, the first delta file comprising a first bitset to indicate a particular set of rows of the first table that have been deleted or updated, and a first set of updated rows;

generating a first updated rows file based on the first set of updated rows;

determining a second set of rows of the first table that have not been modified by performing the first DML operation on the first table;

generating a first residual file based on the second set of rows that have not been modified; and performing a validation process to validate the first DML operation using at least the first delta file, the first residual file, and a matching Copy on Write (CoW) file.

12. The method of claim 11, wherein performing the validation process comprises:

comparing a first particular set of rows generated based on the first delta file and the first residual file with a particular set of rows from the matching CoW file; and determining whether the first particular set of rows matches the particular set of rows.

13. The method of claim 11, wherein performing the validation process comprises:

generating a first hash aggregate for a combined partition resulting from applying a bitset from the first delta file to the first residual file;

generating a second hash aggregate for the matching CoW file; and comparing the first hash aggregate and the second hash aggregate to validate correctness of the first DML operation.

14. The method of claim 11, further comprising:

storing file access information for a validation file in a hidden column of an expression property (EP) file; and storing file access information for the first residual file in a header field of the EP file.

15. The method of claim 11, further comprising:

scheduling deletion of validation files after a configurable time interval; and identifying leaked validation files using a validation file specific suffix.

16. The method of claim 11, wherein performing the validation process comprises:

executing a validation query that performs a comparison using rows from the first delta file and the first residual file against a particular set of rows from the matching CoW file; and reporting any inconsistencies detected during the comparison.

17. The method of claim 11, further comprising:

determining whether to generate validation files based on available computing resources; and controlling a rate of validation file generation using a probability parameter.

18. The method of claim 11, wherein the first DML operation comprises one of:

a delete operation;

an update operation; or a merge operation.

19. The method of claim 11, wherein performing the validation process comprises:

validating change tracking metadata columns when the first table has change tracking enabled.

20. A non-transitory computer-storage medium comprising instructions that, when executed by one or more processors of a machine, configure the machine to perform operations comprising:

receiving a first query, the first query comprising a first set of statements, the first set of statements including at least a first statement for performing a first Data Manipulation Language (DML) operation on a first table;

determining a set of rows that are modified based on performing the first DML operation on the first table, the set of rows including a first set of updated rows;

generating a first delta file based on the determined set of rows, the first delta file comprising a first bitset to indicate a particular set of rows of the first table that have been deleted or updated, and a first set of updated rows;

generating a first updated rows file based on the first set of updated rows;

determining a second set of rows of the first table that have not been modified by performing the first DML operation on the first table;

generating a first residual file based on the second set of rows that have not been modified; and performing a validation process to validate the first DML operation using at least the first delta file, the first residual file, and a matching Copy on Write (CoW) file.

* * * * *